(12) United States Patent
Brown et al.

(10) Patent No.: US 8,903,207 B1
(45) Date of Patent: Dec. 2, 2014

(54) SYSTEM FOR AND METHOD OF EXTENDING VERTICAL FIELD OF VIEW IN HEAD UP DISPLAY UTILIZING A WAVEGUIDE COMBINER

(75) Inventors: Robert D. Brown, Lake Oswego, OR (US); Kurt A. Stahl, Portland, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 343 days.

(21) Appl. No.: 13/251,087

(22) Filed: Sep. 30, 2011

(51) Int. Cl.
*G02B 6/26* (2006.01)
*G02B 27/14* (2006.01)

(52) U.S. Cl.
USPC .......... 385/31; 385/15; 385/37; 359/1; 359/2; 359/3; 359/4; 359/5; 359/6; 359/7; 359/8; 359/9; 359/10; 359/11; 359/12; 359/13; 359/14; 359/15; 359/566; 359/567; 359/630; 359/637

(58) Field of Classification Search
USPC .............. 385/15, 31, 37; 359/1–15, 566–567, 359/630–637
See application file for complete search history.

(56) References Cited

U.S. PATENT DOCUMENTS

| | | | |
|---|---|---|---|
| 2,141,884 A | 12/1938 | Sonnefeld | |
| 4,082,432 A | 4/1978 | Kirschner | |
| 4,178,074 A | 12/1979 | Heller | |
| 4,218,111 A | 8/1980 | Withrington et al. | |
| 4,232,943 A | 11/1980 | Rogers | |
| 4,309,070 A | 1/1982 | St. Leger Searle | |
| 4,647,967 A | 3/1987 | Kirschner et al. | |
| 4,711,512 A | 12/1987 | Upatnieks | |
| 4,714,320 A | 12/1987 | Banbury | |
| 4,775,218 A | 10/1988 | Wood et al. | |
| 5,079,416 A | 1/1992 | Filipovich | |
| 5,218,360 A | 6/1993 | Goetz et al. | |

(Continued)

FOREIGN PATENT DOCUMENTS

| | | | |
|---|---|---|---|
| WO | WO-99/52002 | 10/1999 | |
| WO | WO 2010067117 | * 6/2010 | ............. G02B 27/01 |
| WO | WO 2011/012825 | 2/2011 | |

OTHER PUBLICATIONS

Cameron, A., The Application of Holographic Optical Waveguide Technology to Q-Sight™ Family of Helmet Mounted Displays, Proc. of SPIE, 2009, 11 pages, vol. 7326.

(Continued)

*Primary Examiner* — Ryan Lepisto
*Assistant Examiner* — Guy Anderson
(74) *Attorney, Agent, or Firm* — Donna P. Suchy; Daniel M. Barbieri

(57) ABSTRACT

A Head Up Display can be utilized to find light from an energy source. The Head Up Display includes a first waveguide having a first input coupler and a first output coupler. The Head Up Display can also include a second waveguide having a second input coupler and a second output coupler. The first waveguide has a first major surface and the second waveguide has a second major surface, which are disposed approximately parallel to each other. The first waveguide and the second waveguide are positioned as a combiner and allowing viewing an outside feed and information from an image source. The first input coupler diffracts light in the first field of view into the first waveguide and light in a second field of view reaches the second input coupler and is diffracted into the second waveguide.

14 Claims, 6 Drawing Sheets

(56) References Cited

U.S. PATENT DOCUMENTS

| | | | |
|---|---|---|---|
| 5,341,230 A | 8/1994 | Smith | |
| 5,369,511 A | 11/1994 | Amos | |
| 5,408,346 A | 4/1995 | Trissel et al. | |
| 5,524,272 A | 6/1996 | Podowski et al. | |
| 5,668,907 A | 9/1997 | Veligdan | |
| 5,727,098 A | 3/1998 | Jacobson | |
| 5,856,842 A | 1/1999 | Tedesco | |
| 5,892,598 A | 4/1999 | Asakawa et al. | |
| 5,903,395 A | 5/1999 | Rallison et al. | |
| 6,169,613 B1* | 1/2001 | Amitai et al. | 359/15 |
| 6,176,837 B1 | 1/2001 | Foxlin | |
| 6,333,819 B1 | 12/2001 | Svedenkrans | |
| 6,392,812 B1 | 5/2002 | Howard | |
| 6,409,687 B1 | 6/2002 | Foxlin | |
| 6,550,949 B1 | 4/2003 | Bauer et al. | |
| 6,646,810 B2 | 11/2003 | Harter et al. | |
| 6,757,105 B2 | 6/2004 | Niv et al. | |
| 6,829,095 B2 | 12/2004 | Amitai | |
| 6,847,488 B2 | 1/2005 | Travis | |
| 7,021,777 B2 | 4/2006 | Amitai | |
| 7,027,671 B2 | 4/2006 | Huck et al. | |
| 7,101,048 B2 | 9/2006 | Travis | |
| 7,123,418 B2 | 10/2006 | Weber et al. | |
| 7,181,108 B2 | 2/2007 | Levola | |
| 7,199,934 B2 | 4/2007 | Yamasaki | |
| 7,205,960 B2 | 4/2007 | David | |
| 7,259,906 B1 | 8/2007 | Islam | |
| 7,319,573 B2 | 1/2008 | Nishiyama | |
| 7,391,573 B2 | 6/2008 | Amitai | |
| 7,395,181 B2 | 7/2008 | Foxlin | |
| 7,411,637 B2 | 8/2008 | Weiss | |
| 7,433,116 B1 | 10/2008 | Islam | |
| 7,436,568 B1 | 10/2008 | Kuykendall, Jr. | |
| 7,457,040 B2 | 11/2008 | Amitai | |
| 7,573,640 B2 | 8/2009 | Nivon et al. | |
| 7,576,916 B2 | 8/2009 | Amitai | |
| 7,577,326 B2 | 8/2009 | Amitai | |
| 7,593,575 B2 | 9/2009 | Houle et al. | |
| 7,643,214 B2 | 1/2010 | Amitai | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,733,572 B1 | 6/2010 | Brown et al. | |
| 7,747,113 B2* | 6/2010 | Mukawa et al. | 385/31 |
| 7,751,122 B2 | 7/2010 | Amitai | |
| 7,884,985 B2 | 2/2011 | Amitai et al. | |
| 7,907,342 B2 | 3/2011 | Simmonds et al. | |
| 8,004,765 B2 | 8/2011 | Amitai | |
| RE42,992 E | 12/2011 | David | |
| 8,089,568 B1 | 1/2012 | Brown et al. | |
| 8,189,263 B1 | 5/2012 | Wang et al. | |
| 8,213,065 B2 | 7/2012 | Mukawa | |
| 8,233,204 B1 | 7/2012 | Robbins et al. | |
| 8,398,242 B2 | 3/2013 | Yamamoto et al. | |
| 8,403,490 B2 | 3/2013 | Sugiyama et al. | |
| 8,654,420 B2* | 2/2014 | Simmonds | 359/13 |
| 2003/0063042 A1 | 4/2003 | Friesem et al. | |
| 2006/0132914 A1* | 6/2006 | Weiss et al. | 359/462 |
| 2006/0228073 A1* | 10/2006 | Mukawa et al. | 385/31 |
| 2006/0279662 A1 | 12/2006 | Kapellner et al. | |
| 2007/0019297 A1 | 1/2007 | Stewart et al. | |
| 2008/0043334 A1 | 2/2008 | Itzkovitch et al. | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0278812 A1 | 11/2008 | Amitai | |
| 2008/0285140 A1 | 11/2008 | Amitai | |
| 2009/0019222 A1 | 1/2009 | Verma et al. | |
| 2009/0052046 A1 | 2/2009 | Amitai | |
| 2009/0052047 A1 | 2/2009 | Amitai | |
| 2009/0097122 A1 | 4/2009 | Niv | |
| 2009/0097127 A1 | 4/2009 | Amitai | |
| 2009/0122414 A1 | 5/2009 | Amitai | |
| 2009/0128902 A1 | 5/2009 | Niv et al. | |
| 2009/0128911 A1 | 5/2009 | Itzkovitch et al. | |
| 2009/0153437 A1 | 6/2009 | Aharoni | |
| 2009/0190222 A1 | 7/2009 | Simmonds et al. | |
| 2009/0237804 A1 | 9/2009 | Amitai et al. | |
| 2010/0060551 A1 | 3/2010 | Sugiyama et al. | |
| 2010/0171680 A1 | 7/2010 | Lapidot et al. | |
| 2010/0177388 A1 | 7/2010 | Cohen et al. | |
| 2010/0246004 A1 | 9/2010 | Simmonds | |
| 2010/0246993 A1 | 9/2010 | Rieger et al. | |
| 2010/0265117 A1* | 10/2010 | Weiss | 342/22 |
| 2011/0026128 A1 | 2/2011 | Baker et al. | |
| 2011/0050548 A1 | 3/2011 | Blumenfeld et al. | |
| 2011/0211239 A1* | 9/2011 | Mukawa et al. | 359/15 |
| 2011/0242670 A1* | 10/2011 | Simmonds | 359/633 |
| 2012/0120493 A1 | 5/2012 | Simmonds et al. | |
| 2012/0127577 A1 | 5/2012 | Desserouer | |
| 2012/0235900 A1 | 9/2012 | Border et al. | |
| 2012/0280956 A1 | 11/2012 | Yamamoto et al. | |

OTHER PUBLICATIONS

Wisely, P.L., Head up and head mounted display performance improvements through advanced techniques in the manipulation of light, Proc. of SPIE, 2009, 10 pages, vol. 7327.

Ayras et al., Exit Pupil Expander with a Large Field of View Based on Diffractive Optics, Journal of the SID, 2009, 6 pages.

Notice of Allowance for U.S. Appl. No. 12/700,557, mail date Oct. 22, 2013, 9 pages.

Office Action for U.S. Appl. No. 12/700,557, mail date Aug. 9, 2013, 12 pages.

Office Action for U.S. Appl. No. 12/700,557, mail date Feb. 4, 2013, 11 pages.

Office Action for U.S. Appl. No. 13/250,858 mail date Feb. 19, 2014, 13 page.

Office Action for U.S. Appl. No. 13/250,858, mail date Oct. 28, 2013, 9 pages.

Office Action for U.S. Appl. No. 13/250,940, mail date Aug. 28, 2013, 15 pages.

Office Action for U.S. Appl. No. 13/250,994, mail date Sep. 16, 2013, 11 pages.

Office Action for U.S. Appl. No. 13/250,621, mail date May 21, 2013, 10 pages.

Office Action for U.S. Appl. No. 13/250,940, mail date Mar. 12, 2013, 11 pages.

Office Action for U.S. Appl. No. 13/250,970, mail date Jul. 30, 2013, 4 pages.

Office Action on U.S. Appl. No. 13/250,940 Dated Mar. 25, 2014, 12 pages.

* cited by examiner

SYSTEM FOR AND METHOD OF EXTENDING VERTICAL FIELD OF VIEW IN HEAD UP DISPLAY UTILIZING A WAVEGUIDE COMBINER

CROSS REFERENCE TO RELATED APPLICATIONS

The present application is related to: U.S. patent application Ser. No. 13/250,940, entitled, "Head Up Display (HUD) Utilizing Diffractive Gratings Having Graded Efficiency," filed on an even date herewith, incorporated herein by reference, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on an even date herewith, incorporated herein by reference in its entirety, and assigned to the assignee of the present application; U.S. patent application Ser. No. 13/250,970, entitled, "System for and Method of Stowing HUD Combiners," filed on an even date herewith, incorporated herein by reference in its entirety, and assigned to the assignee of the present application; U.S. patent application Ser. No. 13/250,994, entitled, "Compact Head Up Display (HUD) for Cockpits with Constrained Space Envelopes," filed on an even date herewith, incorporated herein by reference in its entirety, and assigned to the assignee of the present application; and U.S. patent application Ser. No. 13/250,621, entitled, "System for and Method of Catadioptric Collimation in a Compact Head Up Display (HUD)," filed on an even date herewith, incorporated herein by reference herein in its entirety and assigned to the assignee of the present application.

BACKGROUND OF THE INVENTION

The present specification relates to displays. More particularly, the present specification relates to head up displays (HUDs).

Conventional HUDs are generally large, expensive and difficult to fit into small airplanes. Often, conventional HUDs rely on large lenses to form adequate field of view and viewing eye box. Compact HUDs are needed for small business jets and other aircraft where space is constrained in the cockpit.

Substrate guided HUDs have been proposed which use waveguide technology with diffraction gratings to preserve eye box size while reducing lens size. U.S. Pat. No. 4,309,070 issued to St. Leger Searle and U.S. Pat. No. 4,711,512 issued to Upatnieks disclose substrate waveguide HUDS where the pupil of a collimating optical system is effectively expanded by the waveguide structure. However, such systems have faced difficulties in design. For example, U.S. Pat. No. 7,711,512 teaches the use of diffraction gratings based upon holographic materials which can be difficult to process consistently. Holograms are generally extremely angle-sensitive and wavelength-sensitive because they rely on low index modulation throughout a thick volume ($\Delta n<0.05$), where the required phase shift for diffraction can only be met for a small set of wavelengths and angles. Diffraction gratings fabricated using embossing and casting processes are more repeatable but can be limited to organic low refractive index materials, thereby limiting the field of view and spectral range. Diffraction gratings that have mechanically reproduced gratings (ruled gratings) often do not achieve the required resolution for HUD applications. Diffraction gratings implemented using a surface relief geometry provide favorable characteristics compared to the aforementioned types.

Substrate guided HUDs achieve a large eyebox size while reducing the collimating lens size by an affect called pupil expansion. Light from the collimating optics pupil is coupled into the waveguide substrate by a first surface relief diffraction grating. The pupil expansion effect comes about by using a relatively weak (low diffraction efficiency) second surface relief diffraction grating with a larger extent in the desired expansion direction compared to the first grating, so that light propagating within the waveguide interacts many times with the second diffraction grating, gradually coupling out along the length of the waveguide and effectively creating an expansion of the collimating optics pupil. The gradual out-coupling action means that at each subsequent interaction with the second diffraction grating there is less light available compared to the previous interaction, so the expanded pupil luminance becomes lower and lower along the length of the second diffraction grating. This luminance decrease is manifested as a luminance non-uniformity in the displayed HUD image. Therefore, there is a need for a means of balancing the expanded pupil luminance along the length of the surface relief out-coupling diffraction grating.

SUMMARY OF INVENTION

An exemplary embodiment relates to a head up display for providing light from an image source. The head up display includes a first waveguide having a first input coupler and a first output coupler. The head up display also includes a second waveguide having a second input coupler and a second output coupler. The first waveguide has a first major surface and the second waveguide has a second major surface. The first major surface is disposed approximately parallel to the second major surface. The first waveguide and the second waveguide are positioned as a combiner and allow viewing of an outside scene and information from the image source. The first input coupler diffracts light in a first field of view into the first waveguide. Light in a second field of view reaches the second input coupler and is diffracted into the second waveguide.

Another exemplary embodiment relates to a method of providing information to a pilot. The method includes diffracting first light from light associated with the information into a first waveguide. The first light is associated with a first field of view range. The method also includes diffracting second light from the light associated with the information into a second waveguide. The second light being associated with a second field of view range. The method further includes providing the first light out of the first waveguide and the second light out of the second waveguide. The first and second waveguides are configured as a combiner for providing the information to the pilot and allowing viewing of the real world scene.

Another exemplary embodiment relates to an optical system for a head up display. The optical system includes a combiner. The combiner includes a first waveguide and a second waveguide. The first waveguide includes first input diffraction grating and first output diffraction grating. The second waveguide includes a second input diffraction grating and a second output diffraction grating. The first output diffraction grating provides light for a first field of view and the second output diffraction grating provides light for a second field of view.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
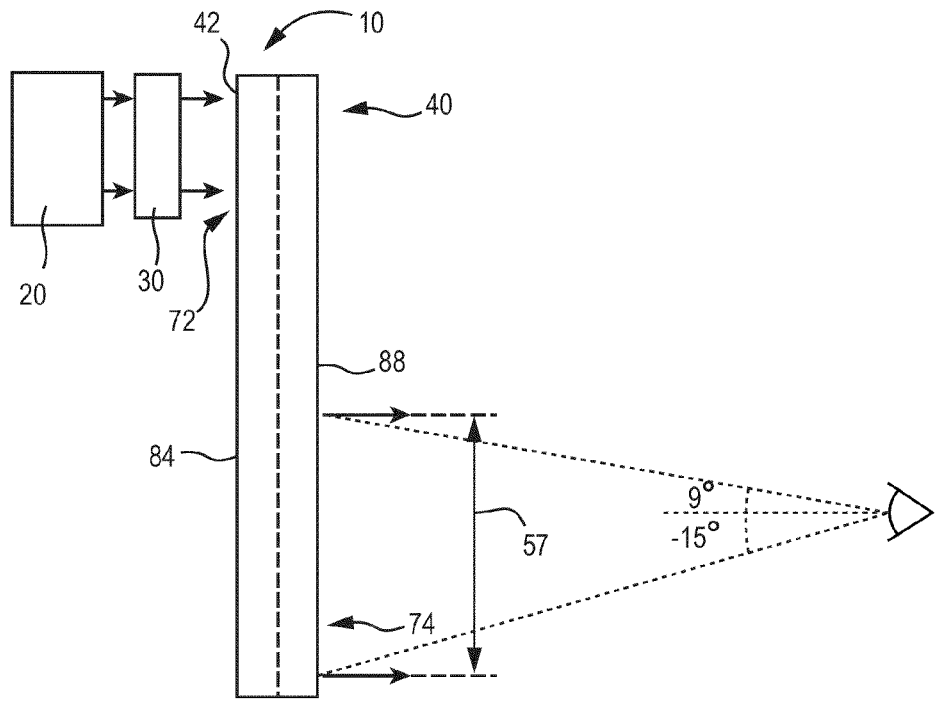
FIG. 1 is a general block diagram of a head up display (HUD) system including a substrate waveguide combiner in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, head up display (HUD) system 10 can be utilized in various applications, including aviation, medical, naval, targeting, ground based, military, etc. HUD system 10 is preferably configured for use in smaller cockpit environments and yet provides an appropriate field of view and eye box for avionic applications.

HUD system 10 preferably includes an image source 20 and a substrate waveguide combiner 40. Substrate waveguide combiner 40 is advantageously configured to provide an adequate field of view for HUD combiner applications. Image source 20 can be any device for providing an image including, but not limited to, a CRT display, an LED display, an active matrix liquid crystal display (LCD), etc. In a preferred embodiment, image source 20 is a micro LCD assembly and can provide linearly polarized light without serious loss of uniformity. In one embodiment, the vertical field of view for system 10 is from −15 to +9 degrees.

In addition, system 10 can include collimating optics 30 disposed between substrate waveguide combiner 40 and image source 20. Collimating optics 30 can be a single optical component, such as a lens, or include multiple optical components. In one embodiment, collimating optics 30 are configured as a catadioptric collimator. Collimating optics 30 can be any optical component or configuration of optical components that provide light (preferably collimated light) from image source 20 to an input 72 substrate waveguide combiner 40. Collimating optics 30 can be integrated with or spaced apart from image source 20 and/or substrate waveguide combiner 40.

In operation, system 10 provides images from image source 20 to a pilot or other operator so that the pilot can simultaneously view the images and a real world scene. The images can include graphic and/or text information (e.g., flight path vector, etc.) related to avionic information in one embodiment. In addition, the images can include synthetic or enhanced vision images. In one embodiment, collimated light representing the image from image source 20 is provided at an output 74 on substrate waveguide combiner 40 so that the pilot can view the image conformally on the real world scene through substrate waveguide combiner 40. Waveguide combiner 40 is preferably transparent for viewing the real world scene through main surfaces or sides 84 and 88.

In one preferred embodiment, system 10 is configured to provide uniform luminance and expand the pupil of system 10 in a single axis (e.g., along vertical axis 57). In one embodiment, substrate waveguide combiner 40 provides an approximately 100 mm vertical×75 mm horizontal exit pupil. Waveguide combiner 40 can effect the single axis pupil expansion and is configured to provide uniform luminance. The single axis expansion can be on the order of 2 to 7 times (e.g., approximately 4 times in one preferred embodiment). Other orders of pupil expansion are possible depending upon performance criteria, design parameters, and optical components utilized without departing from the scope of the invention.

Substrate waveguide combiner 40 can have a variety of shapes including generally rectangular, oval, circular, tear drop-shaped, hexagonal, rectangular with rounded corners, square-shaped, etc.

In operation, substrate waveguide combiner 40 advantageously receives light from image source 20 provided through collimating optics 30 at input 72 and provides light to a user at output 74. Image source 20 provides information using a single color of light (e.g., a green light with wavelengths approximately between 500 and 550 nanometers (nm)). The light provided to substrate waveguide combiner 40 is preferably linearly S polarized and collimated. Alternatively, other polarization, multiple colors, or other colors at different wavelengths can be utilized without departing from the scope of the invention.

Figure 2:
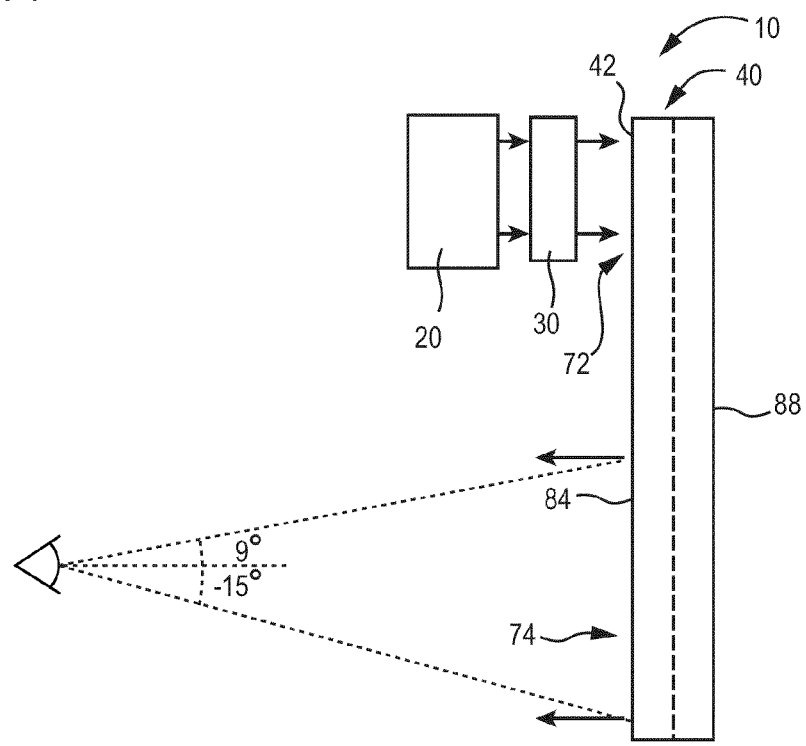
FIG. 2 is a general block diagram of a HUD system including a substrate waveguide combiner in accordance with another exemplary embodiment.

Substrate waveguide combiner 40 preferably performs two operations in a preferred embodiment. First, substrate waveguide combiner 40 is disposed to provide a medium for transporting light by total internal reflection from input 72 to output 74. Second, substrate waveguide combiner 40 operates as a combiner allowing the user to view the light from image source 20 at output 74 and light from the real world scene through sides 84 and 88. With reference to FIG. 2, substrate waveguide combiner 40 can be configured to have input 72 and output 74 on side 84.

Applicants have found that substrate guided HUDs can have difficulty achieving vertical fields of view greater than 18 degrees while maintaining uniform luminance. Surface relief diffraction gratings generally lose diffraction efficiency very quickly for viewing angles in excess of 18 degrees. At viewing angles above +9 degrees, waveguides using surface relief gratings can fail to propagate light due to failure of total internal reflection. At viewing angles below −9 degrees, the efficiency of the grating drops rapidly. Extending the field of view to viewing angles below −9 degrees can be achieved if grating efficiency is high. However, creating higher efficiencies causes the efficiency to be higher for all viewing angles, not just the lowest ones, thereby contributing to non-uniform luminance. Applicants have found that a grating that improves low angle reflections can be used without significant adverse changes to the rest of the field of view by employing an advantageous configuration of waveguide combiner 40.

Figure 3A:
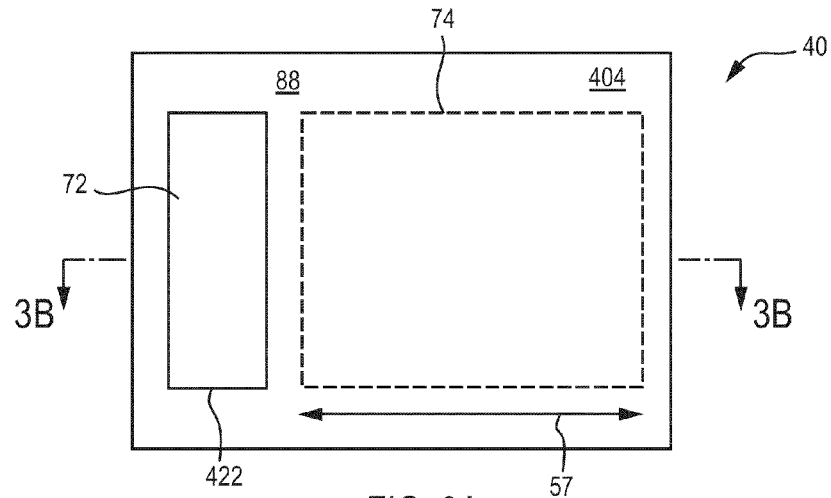
FIG. 3A is a top view schematic drawing of the substrate waveguide combiner for the system illustrated in FIG. 1 in accordance with yet another exemplary embodiment.
Figure 3B:
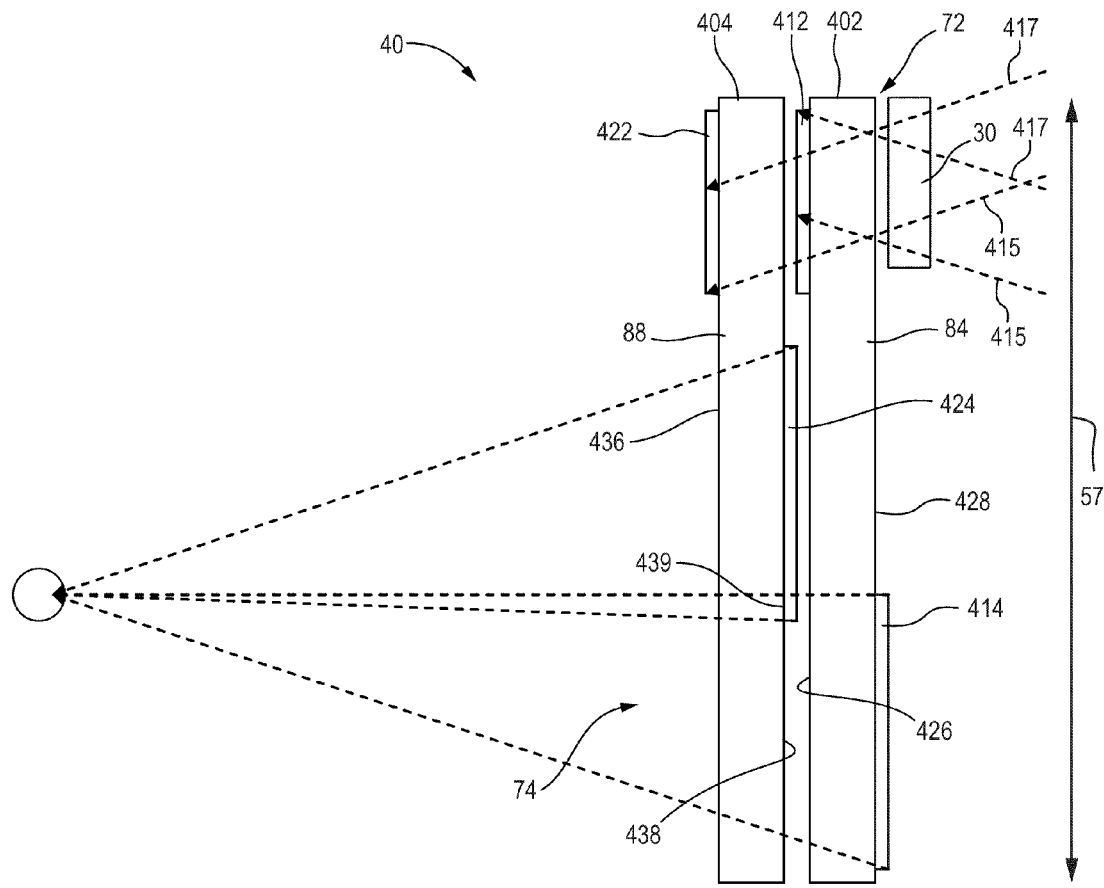
FIG. 3B is a cross sectional view of the substrate waveguide combiner illustrated in FIG. 3A along line 3B-3B in accordance with an exemplary embodiment.

With reference to FIGS. 3A and 3B, waveguide combiner 40 can be comprised of a first waveguide 402 and a second waveguide 404. Waveguide 402 includes a first input coupler 412 at input 72 and is preferably configured to provide light 415 in a first field of view (e.g., −15 to −3 degrees) for propagation via total internal reflection down waveguide 402 to a first output coupler 414. Input coupler 412 also allows light 417 in a second field of view (e.g., −3 to +9 degrees) to pass through coupler 412 to second input coupler 422 of waveguide 404. The efficiency to field of view response of coupler 412 is chosen to effect the appropriate diffraction of light 415 to output coupler 414 and transmission of light 417 to input coupler 422. Applicants note that the field of view ranges discussed above are exemplary only; various design criteria and system parameters may effect the choice of fields of view for system 10 and substrate waveguide combiner 40.

A second output coupler 424 is preferably disposed between coupler 414 and couplers 422 and 412 along a longitudinal or vertical axis 57 of waveguide combiner 40. Coupler 412 is preferably provided on major side 426, and coupler 414 is preferably provided on major side 84. Coupler 424 is preferably provided on a major surface for 438, and coupler 422 is preferably provided on a major side 88. Sides 84, 88, 426, and 438 are preferably approximately parallel. Couplers 414 and 424 are preferably offset from each other and can be overlapped at overlap region 439.

Couplers 412, 414, 422 and 424 can be provided on separate substrates that are adhered to respective plates associated with waveguides 402 and 404. Couplers 412, 414, 422 and 424 can also be provided directly on waveguides 402 and 404. Waveguides 402 and 404 can be glass material. In one embodiment, waveguides 402 and 404 can have a thickness of between 0.25 and 1 inch and are an inorganic glass material having an index of refraction of approximately 1.55-1.8.

In preferred embodiment, input coupler 412 is disposed closest to collimating optics 30 and efficiently diffracts light 417 in the −15 to −3 degree field of view into waveguide 402 and efficiently transmits light 419 in the −3 to +9 degree field of view through surface 438 of waveguide 402 to coupler 422. In one preferred embodiment, coupler 412 is a volumetric grating, such as, a holographic grating. Coupler 412 is preferably designed to have a sharp angular cut-on in the transition region.

Figure 6:
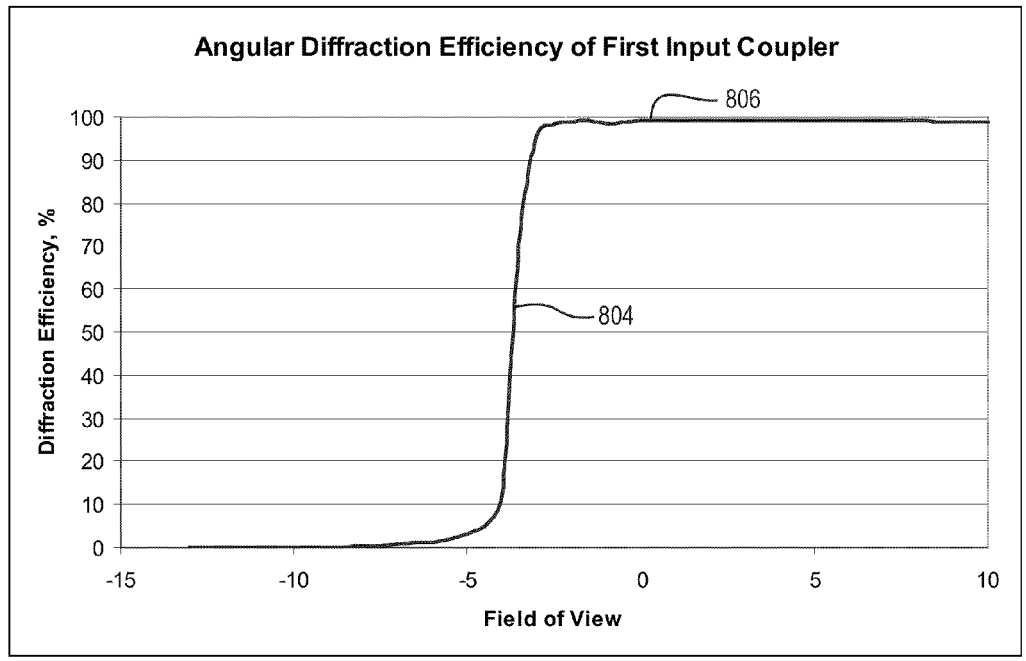
FIG. 6 is a graph showing the relationship of angular diffraction efficiency versus field of view for a first input coupler embodied as a volumetric grating for the substrate waveguide combiner illustrated in FIG. 3B in accordance with an exemplary embodiment.

In one embodiment, coupler 412 has an efficiency to vertical field of view response 806 as shown in FIG. 6. Response 806 has cut-on region 804 at approximately −3 to −4 degrees.

In FIG. 6, an X axis represents field of view and a Y axis represents diffraction efficiency for coupler 402.

According to one embodiment, couplers 414, 422, and 424 can be volumetric (e.g., holographic) gratings. According to other embodiments, couplers 414, 422, and 424 can be surface relief gratings formed by lithographic mastering in a high index of refraction material. In another embodiment, couplers 414, 422 and 424 can be formed by embossing, casting, etc. Although particular exemplary techniques and grating types are discussed above, other techniques, structures, and grating types can be utilized without departing from the scope of the invention.

Figure 7:
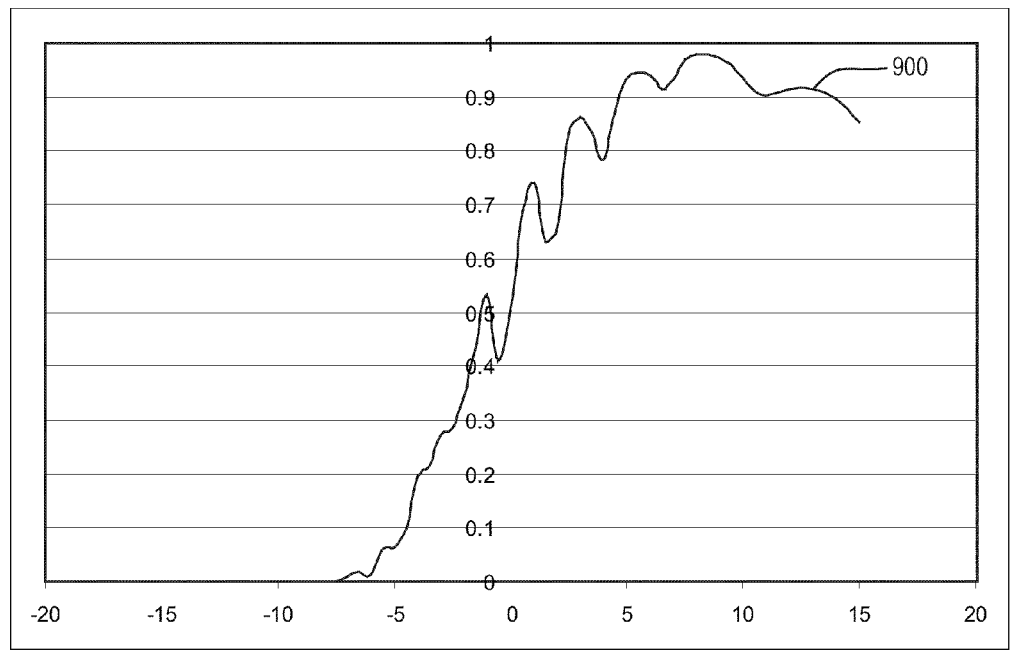
FIG. 7 is a graph showing the relationship of angular diffraction efficiency of an input coupler embodied as a Switchable Bragg Grating (SBG) for the substrate waveguide combiner illustrated in FIG. 3B in accordance with another exemplary embodiment.

In alternative embodiment, coupler 412 can be a Switchable Bragg Grating (SBG). In one embodiment, coupler 412 (embodied as the SBG) has an efficiency-to-viewing angle response 900 as shown in FIG. 7. Response 900 is when the SBG is turned on. In FIG. 7, an X axis represents field of view and an Y axis represents transmission efficiency in FIG. 7.

The SBG does not need to have a steep slope in the transition region and can be switched on and off at a high rate. In the on-state, the hologram associated with the SBG diffracts the light in the −15 to −3 field of view into waveguide 402. In one embodiment, the SBG also can transmit light from the −3 to +9 degree field of view to the second waveguide. According to one embodiment, waveguide 402 is designed so that coupler 414 only diffracts the light in the −15 to −3 field of view to the eye of the pilot. The location of coupler 414 can be responsible for this effect. In the off-state, the SBG transmits all of the light into second waveguide 404. However, waveguide 404 only directs the light in the −3 to +9 degree field of view to the eye of the pilot with a small overlap due to location of coupler 424. Therefore, each of waveguides 402 and 404 displays a uniformly illuminated field of view.

Brightness may be reduced due to the duty cycle associated with the SBG. The SBG can have a duty cycle of 50% in one embodiment. Applicants believe that there is a potential for greater efficiency by using a more efficient input coupler 412 and having fewer bounces through each coupler 414 and 424.

Figure 8:
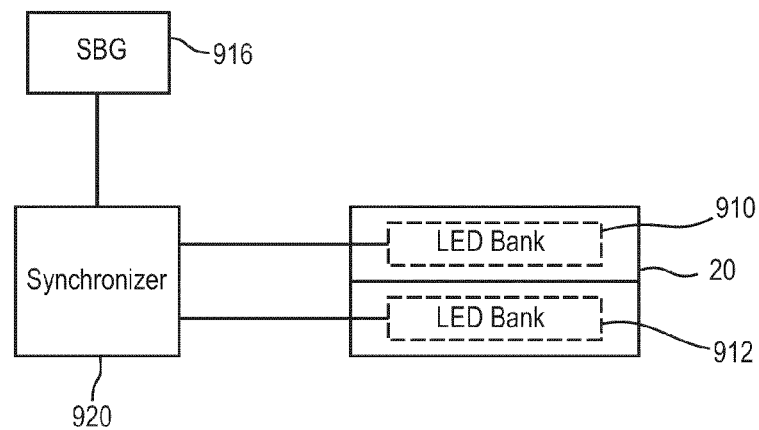
FIG. 8 is a schematic general block diagram of a synchronization circuit coupled to a SBG in the substrate waveguide combiner illustrated in FIG. 3B and coupled to an image source for the system illustrated in FIG. 1 in accordance with yet another exemplary embodiment.

With reference to FIG. 8, additional recovery of efficiency can be realized by arranging LEDs in the back light of image source in two banks A first bank 910 generally illuminates the −15 to −30 degree area of the LCD image source 20, and a second bank 912 generally illuminates the −3 to +9 degree area of the LCD image source. Each bank 910 and 912 is driven at a 50% duty cycle synchronized with SBG 916 disposed as coupler 412. In such embodiment, synchronization circuit 920 can be utilized to provide signals to drive banks 910 and 912 of image source 20 in synchronism with SBG 916. Synchronization circuit 920 can be a timing circuit or driver circuit for providing control signals to banks 910 and 912 and to SBG 916. Circuit 920 can be part of source 20 in one embodiment.

Figure 9:
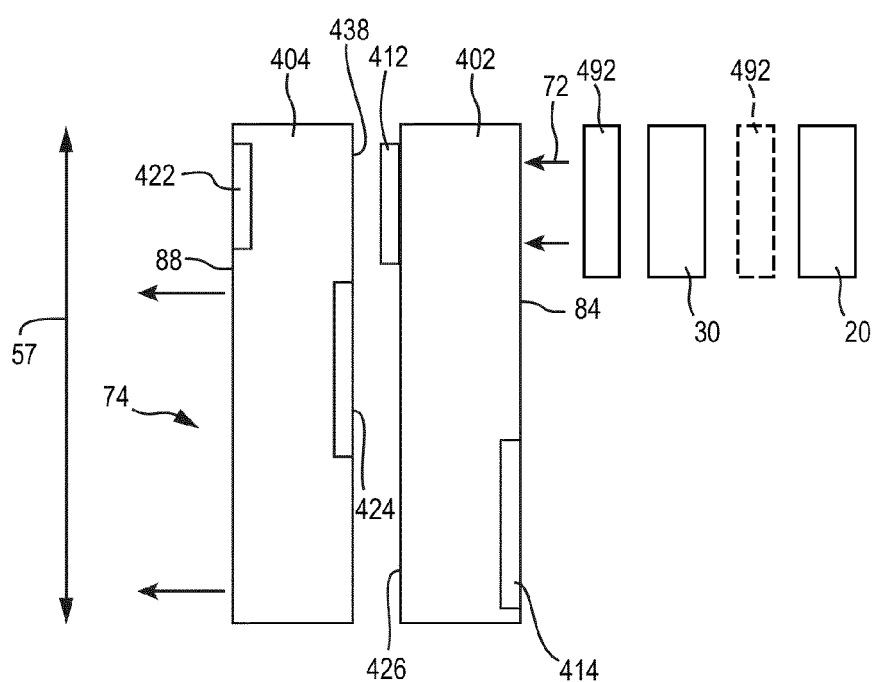
FIG. 9 is a schematic general block diagram of a HUD system including a substrate waveguide combiner in accordance with another exemplary embodiment.

With reference to FIG. 9, system 10 can include an electronic half wave retarder 492 disposed between collimating optics 30 and waveguide 402. Alternatively, electronic half wave retarder 492 can be provided between image source 20 and collimating optics 30. In one embodiment, retarder 492 is provided over image source 20 or at the output of collimating optics 30.

In one embodiment, couplers 412, 414, 422 and 424 are polarization sensitive diffraction gratings. Coupler 412 can be bypassed by using P polarized light and rotating back to S polarized light using a static half wave retarder film 498 disposed on side 438 of waveguide 404 (e.g., the input side of waveguide 404). Electronic half wave retarder 492 can be switched to S polarization so that light is diffracted by input coupler 402 into first waveguide 402. In one embodiment using film 498 and electronic half wave retarder 492, couplers 412, 414, 422 and 424 are embodied as surface relief diffraction gratings. Film 498 can be disposed on portion of side 438 in front of coupler 412, on the entire surface of side 438, or on surface of side 426 of waveguide 402.

Figure 10:
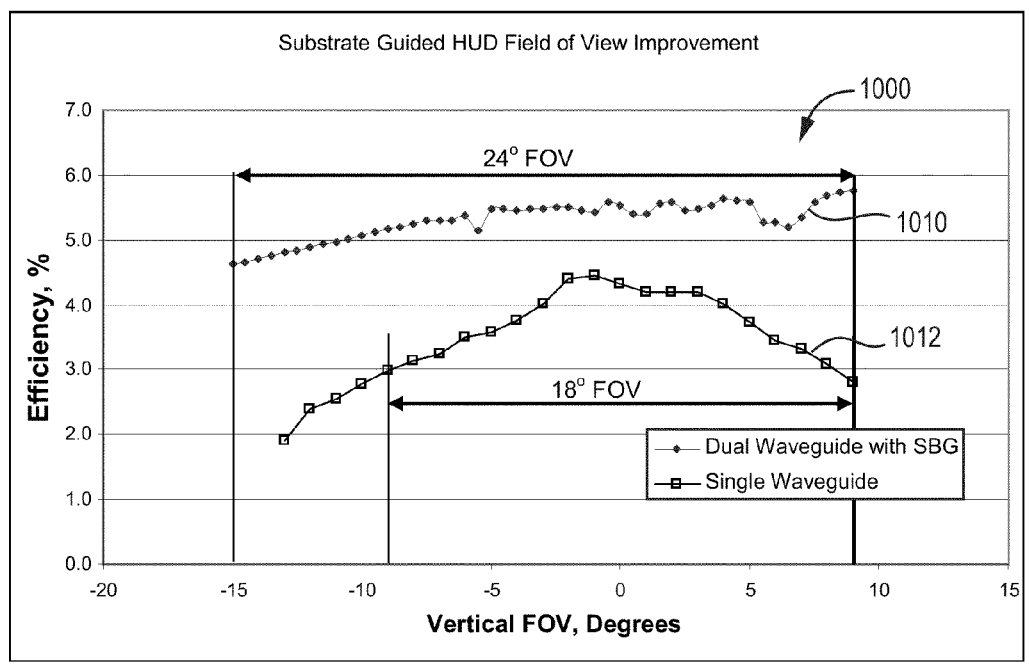
FIG. 10 is a graph showing the relationship of efficiency versus vertical field of view for the system illustrated in FIG. 1 and a HUD using a single waveguide as a combiner.

With reference to FIG. 10, a graph 1000 shows the efficiency versus field of view for system 10 utilizing waveguides 402 an 404 and a single plate waveguide. In FIG. 10, an X axis represents field of view, and Y axis represents efficiency. A response 1010 is for a combiner using waveguides 402 and 404, and a response 1012 for a single plate waveguide. As shown in FIG. 11, response 1010 shows a more uniform efficiency over the field of view. In addition, the field of view associated with response 1010 is larger and ranges from −15 degrees to +9 degrees in one embodiment. Response 1012 shows a field of view from −9 degrees to +9 degrees.

Figure 4:
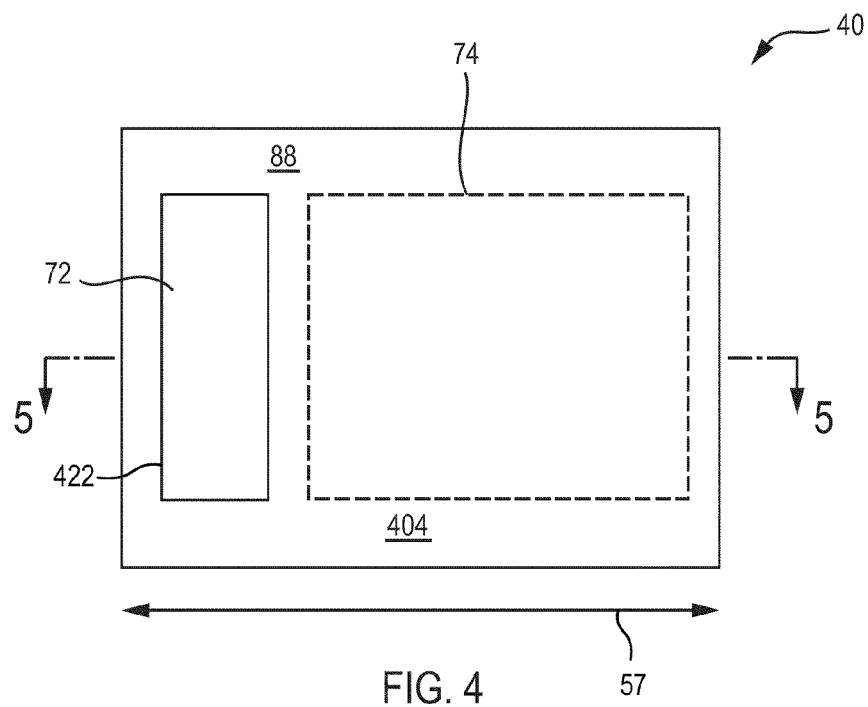
FIG. 4 is a top view schematic drawing of a substrate waveguide combiner for the system illustrated in FIG. 1 in accordance with still another exemplary embodiment.
Figure 5:
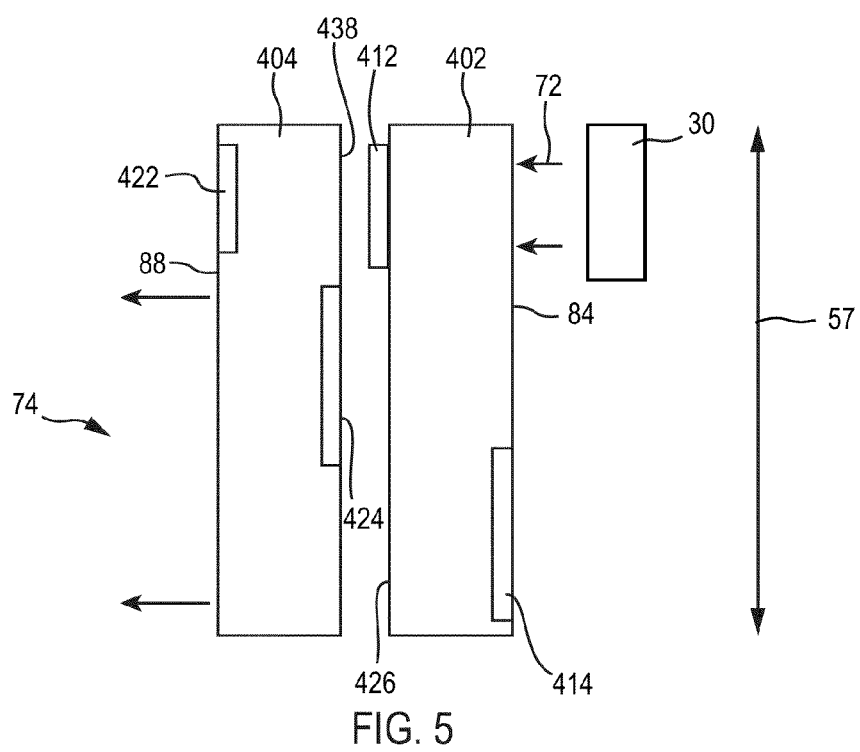
FIG. 5 is a cross sectional view schematic drawing of the substrate waveguide combiner illustrated in FIG. 4 along line 5-5.

With reference to FIGS. 4 and 5, couplers 422 and 424 can be provided directly on a glass plate (preferably having a high refractive index) associated with waveguide 404 in one embodiment. Similarly, coupler 414 can be provided directly on a glass plate (preferably having a high refractive index) associated with a waveguide 404 in one embodiment. In such embodiments, couplers 414, 422, and 424 can be surface relief gratings.

In certain embodiments, diffraction grating periods for coupler 412 can be matched to surface relief grating periods for couplers 414, 422 and 424. Thicknesses, index modulation and field of views can be optimized for system parameters. The placement of gratings or couplers 412, 414, 422, and 424 on respective sides 426, 84, 88 and 438 of waveguides 402 and 404 are not shown in a limiting fashion.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A head up display for providing light from an image source, the image source comprising a backlight having a first bank and a second bank, the head up display comprising:
   a first waveguide having a first input coupler and a first output coupler; and
   a second waveguide having a second input coupler and a second output coupler, the first waveguide having a first major surface and the second waveguide having a second major surface, wherein the first major surface being disposed approximately parallel to the second major surface, wherein the first waveguide and the second waveguide being positioned as a combiner and allow viewing of an outside scene and information from the image source, wherein the first input coupler diffracts light in a first field of view into the first waveguide and light in a second field of view reaches the second input coupler and is diffracted into the second waveguide wherein light from the first bank and light from the second bank is switched in synchronism with control of light through the first input coupler.

2. The head up display of claim 1, wherein the first output coupler is a diffraction grating and is at least partially displaced on the first major surface from the second output coupler on the second major surface and wherein the first output coupler and the second output coupler overlap in a small region.

3. The head up display of claim 2, wherein the waveguide provides pupil expansion.

4. The head up display of claim 3, wherein the pupil expansion is in the at least one direction.

5. The head up display of claim 1, wherein the first input coupler is a volumetric grating or a switchable Bragg grating.

6. The head up display of claim 5, wherein the first input coupler is a holographic grating.

7. The head up display of claim 1, wherein light from the image source enters the first waveguide and leaves the first waveguide on a same side.

8. The head up display of claim 7, wherein the light travels through the waveguide by total internal reflection.

9. The head up display of claim 1, wherein the first output coupler and the second output coupler are surface relief gratings.

10. The head up display of claim 9, wherein the second input coupler is a surface relief grating or a volumetric grating.

11. An optical system for a head up display including an image source having a light source, the light source having a first bank and a second bank, the optical system comprising:
   a combiner comprising a first waveguide and a second waveguide, the first waveguide including a first input diffraction grating and a first output diffraction grating, the second waveguide including a second input diffraction grating and a second output diffraction grating, wherein the first output diffraction grating provides light for a first field of view and the second output diffraction grating provides light for a second field of view, wherein light is provided through the first input diffraction grating in synchronism with operation of the first bank.

12. The system of claim 11, wherein the first input diffraction grating allows a portion of input light to reach the second input diffraction grating and provides another portion of the input light to the first output diffraction grating.

13. The system of claim 11, wherein the second output diffraction grating, the first output diffraction grating and the second input diffraction grating are surface relief gratings.

14. The system of claim 11, wherein the first input diffraction grating is disposed on a first side of the first waveguide, the first output diffraction grating disposed on a second side of the first waveguide, the first side being opposite the second side, the second input grating is disposed on a first side of the second waveguide, the second output diffraction grating disposed on a second side of the second waveguide, the first side being opposite the second side.

* * * * *